United States Patent
Nagaoka et al.

(10) Patent No.: US 11,571,001 B2
(45) Date of Patent: Feb. 7, 2023

(54) BILAYER-TYPE FERMENTED MILK PRODUCT AND PRODUCTION METHOD THEREFOR

(71) Applicant: MEIJI CO., LTD., Tokyo (JP)

(72) Inventors: Seiji Nagaoka, Odawara (JP); Takuya Takabayashi, Odawara (JP); Nobuko Inoue, Odawara (JP); Haruka Urayama, Odawara (JP); Kenichi Hojo, Odawara (JP)

(73) Assignee: Meiji Co., Ltd., Tokyo (JP)

( * ) Notice: Subject to any disclaimer, the term of this patent is extended or adjusted under 35 U.S.C. 154(b) by 187 days.

(21) Appl. No.: 16/336,465

(22) PCT Filed: Sep. 26, 2017

(86) PCT No.: PCT/JP2017/034802
§ 371 (c)(1),
(2) Date: Mar. 25, 2019

(87) PCT Pub. No.: WO2018/062206
PCT Pub. Date: Apr. 5, 2018

(65) Prior Publication Data
US 2019/0239525 A1 Aug. 8, 2019

(30) Foreign Application Priority Data

Sep. 28, 2016 (JP) .............................. JP2016-190209

(51) Int. Cl.
*A23C 9/133* (2006.01)
*A23L 29/231* (2016.01)
*A23C 9/12* (2006.01)

(52) U.S. Cl.
CPC ................ *A23C 9/133* (2013.01); *A23C 9/12* (2013.01); *A23L 29/231* (2016.08); *A23V 2002/00* (2013.01)

(58) Field of Classification Search
CPC ......... A23L 29/231; A23C 9/12; A23C 9/137; A23C 9/133; A23C 2270/05; A23V 2002/00; A23V 2250/50724
(Continued)

(56) References Cited

U.S. PATENT DOCUMENTS

2013/0156889 A1* 6/2013 Schroeder .............. A23C 9/137
426/577

FOREIGN PATENT DOCUMENTS

| GB | 1413965 A | * 11/1975 | ............. A23C 9/133 |
| JP | 1-222736 A | 9/1989 | |

(Continued)

OTHER PUBLICATIONS

Orii et al. JP2815363.B machine translation of description (Year: 1998).*

(Continued)

*Primary Examiner* — Subbalakshmi Prakash
(74) *Attorney, Agent, or Firm* — Pyprus Pte Ltd; George D. Liu

(57) ABSTRACT

To provide a bilayer-type fermented milk product that is able to maintain a sharp interface between a fermented milk layer and a foodstuff layer without adding a gelling agent, such as low-methoxyl pectin and gelatin, to the fermented milk layer. This fermented milk product has a foodstuff layer formed as an upper layer of a fermented milk layer, wherein: the foodstuff layer has added thereto a low-methoxyl pectin having an esterification degree of less than 50; the fermented milk layer is configured to have a viscosity of 3500 cp or more; and a value obtained by subtracting the Brix value of the fermented milk layer from the Brix value of the foodstuff layer is adjusted to 21 or less.

1 Claim, 1 Drawing Sheet

(58) Field of Classification Search
USPC .......................................................... 426/583
See application file for complete search history.

(56) References Cited

FOREIGN PATENT DOCUMENTS

| | | |
|---|---|---|
| JP | 2815363 B2 | 10/1998 |
| JP | 2000-270817 A | 10/2000 |
| JP | 2013-13339 A | 1/2013 |

OTHER PUBLICATIONS

International Search Report of International Patent Application No. PCT/JP2017/034802 completed Dec. 19, 2017 and dated Dec. 26, 2017 (3pages).
Written Opinion of International Patent Application No. PCT/JP2017/034802 completed Dec. 19, 2017 and dated Dec. 26, 2017 (4 pages).

* cited by examiner

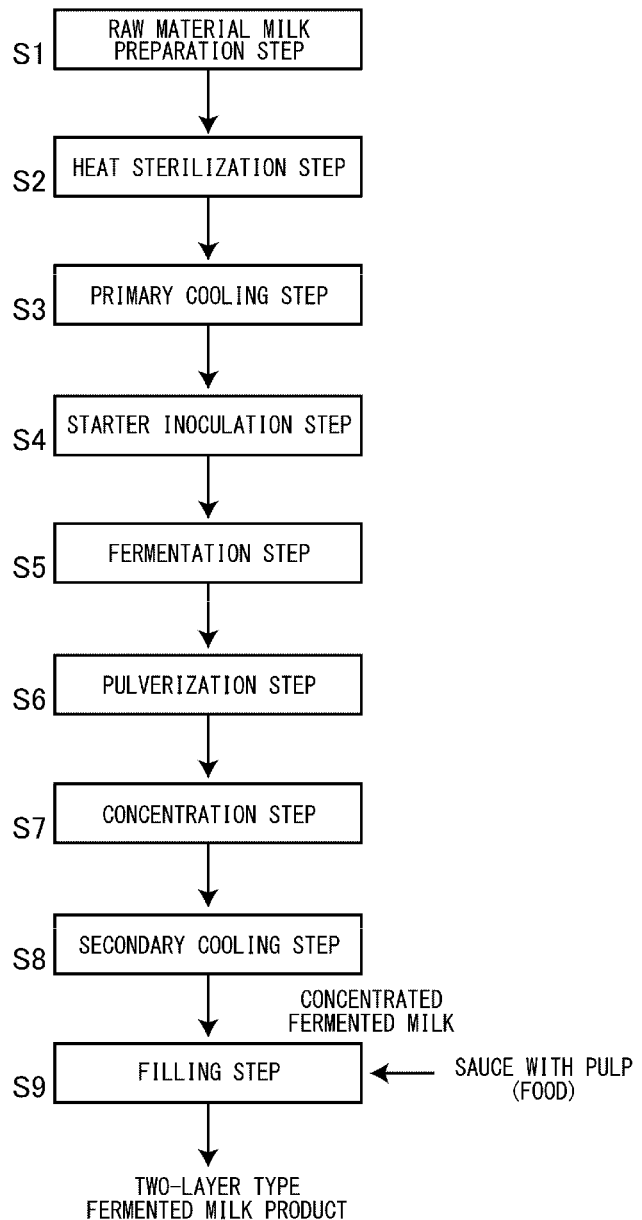

BILAYER-TYPE FERMENTED MILK PRODUCT AND PRODUCTION METHOD THEREFOR

TECHNICAL FIELD

The present invention relates to a two-layer type fermented milk product in which a food such as a fruit sauce is placed on a fermented milk, and a method for manufacturing the same. More specifically, the present invention relates to a technique for maintaining a clear boundary surface between layers even when a product in which a food having a high specific gravity is placed on a fermented milk is stored for a certain period of time.

BACKGROUND ART

In recent years, with the diversification of a fermented milk product (for example, a yoghurt product), there is an increasing need for a two-layer type fermented milk product in which various foods such as fruit sauces are placed on a fermented milk layer. However, when a food layer having a high specific gravity such as a fruit sauce is filled on the fermented milk, the food layer sinks in the fermented milk layer due to the vibration or the like during transportation of the fermented milk product, and the clear boundary surface between the layers cannot be maintained, resulting in decreased commercial value. Specifically, during the filling step of the food layer and the distribution process of the product, the fermented milk layer and the food layer mix together and become muddy, and the boundary surface between the layers becomes unclear, thereby the appearance of the product is impaired. In addition, there is a problem that moving of the sweetness and/or the flavor between the food layer and the fermented milk layer occurs during storage, and the flavor of the fermented milk product suitably adjusted by the manufacturer is impaired.

In view of the problems of the two-layer type fermented milk product, the applicant of the present invention has proposed a method for manufacturing a fermented milk product (a yoghurt product) having extremely clear separation between the layers and high commercial value in Patent Literature 1. Patent Literature 1 discloses a method for manufacturing a two-layer yoghurt including: pulverizing a curd of a fermented milk prepared by addition of gelatin and/or a low methoxyl pectin (hereinafter also referred to as "an LM pectin") and filling the pulverized curd to a container at a viscosity of 4000 cp or more; and filling a food to which an LM pectin having an esterification degree of 32 to 40 is added in the container.

CITATION LIST

Patent Literature

Patent Literature 1: JP 2815363 B2

SUMMARY OF INVENTION

Technical Problem

As described in Patent Literature 1 above, adding a gelling agent such as an LM pectin and gelatin to both the fermented milk layer and the food layer to maintain the boundary surface between the fermented milk layer and the food layer in the manufacture of a two-layer type fermented milk product is common technical knowledge. However, there is a problem that when a gelling agent is added to the fermented milk layer characterized by relatively light taste and milk flavor, the characteristic milk flavor is impaired, resulting in decreased value of the whole product, even though the flavor is not particularly impaired when a gelling agent is added to a food layer having a strong sweetness. In recent years, because consumers tend to like a fermented milk layer having a natural and good feeling on the tongue more than a fermented milk layer having a gummy and unnatural mouthfeel due to a gelling agent, addition of a gelling agent to the fermented milk layer does not meet the needs of such consumers.

Therefore, an object of the present invention is to provide a technique that allows to maintain a clear boundary surface between the fermented milk layer and the food layer without addition of a gelling agent such as an LM pectin and gelatin to the fermented milk layer.

Solution to Problem

As a result of intensive studies on the solution of the above-mentioned problems, the inventors of the present invention have obtained a finding that the clear boundary surface between the layers can be maintained without addition of a gelling agent such as an LM pectin and gelatin to the fermented milk layer by adding an LM pectin to the food layer in the two-layer type fermented milk product in which the food layer is formed on the fermented milk layer, maintaining the viscosity of the fermented milk layer at a predetermined value or more, and adjusting the difference in Brix values between the food layer and the fermented milk layer to a predetermined value or less (specifically, 21 or less). The present inventors have found that the problems in the conventional art can be solved based on the above finding, thereby completing the present invention. Specifically, the present invention has the following structures and steps.

A first aspect of the present invention relates to a two-layer type fermented milk product. The fermented milk product according to the present invention includes: a fermented milk layer; and a food layer placed on the fermented milk layer. The "food layer" is a layer formed by foods other than fermented milks, and includes the layer partially formed on the fermented milk layer in addition to the layer formed on the whole area of the fermented milk layer. The food layer contains a low methoxyl pectin (an LM pectin) having an esterification degree of less than 50. The fermented milk layer has a viscosity of 3500 cp or more. In the fermented milk product according to the present invention, a value obtained by subtracting a Brix value of the fermented milk layer from a Brix value of the food layer is adjusted to 21 or less. Thus, the present inventors have unexpectedly succeeded in suppressing moving of color, sweetness, and flavor between the layers and maintaining the clear boundary surface between the layers by keeping the difference in Brix values between the food layer and the fermented milk layer at a certain value or less.

In the fermented milk product of the present invention, it is preferable that the food layer have a content of an LM pectin of 0.2 to 0.8 wt %, and the LM pectin have an esterification degree of 15 to 40. As shown in Examples described later, when an LM pectin having an esterification degree of more than 40 is used in the example in which the food layer has a concentration of an LM pectin of 0.2 to 0.8 wt %, there is a problem that the boundary surface between the food layer and the fermented milk layer becomes unclear. Meanwhile, when an LM pectin having an esterification degree of less than 15 is used, the food layer cracks. Therefore, in the fermented milk product of the present invention, an LM pectin having an esterification degree of 15 to 40 is suitably employed.

In the fermented milk product of the present invention, the value obtained by subtracting a Brix value of the fermented milk layer from a Brix value of the food layer is preferably 11 to 21. As shown in Examples described later, when the difference in Brix values is more than 21, there is a problem that the boundary surface between the food layer and the fermented milk layer becomes unclear. Meanwhile, when the difference in Brix values is less than 11, the sugar content of the food layer is too low or the sugar content of the fermented milk layer is too high, thus the flavor contrast between the food layer and the fermented milk layer is lost, and delicious fermented milk product cannot be provided. Therefore, in the fermented milk product of the present invention, the difference in Brix values is preferably in the range of 11 to 21.

In the fermented milk product of the present invention, the Brix value of the food layer is preferably 32 or less. A typical example of the food layer is a fruit sauce. In the present invention, the sugar content of the food layer is intentionally adjusted to a low level by setting the Brix value at 32 or less to prioritize the maintenance of the boundary surface between the food layer and the fermented milk layer. In a conventional two-layer type fermented milk product, the food layer generally has a high sugar content to enhance the sweetness of the food layer. From this fact, it can be said that those skilled in the art at the time of this application do not actively set the Brix value of the food layer at 32 or less as in the present invention.

In the fermented milk product of the present invention, the food layer preferably contains a high intensity sweetener. The inventors of the present invention have found that the sweetness of the food layer can be increased while suppressing the increase of the Brix value of the food layer by adding a high intensity sweetener such as stevia and aspartame to the food layer. Therefore, by adding a high intensity sweetener to the food layer, a fermented milk product that exhibits a moderate sweetness can be provided while keeping the difference in Brix values between the food layer and the fermented milk layer within 21 or less.

In the fermented milk product of the present invention, the fermented milk layer preferably does not contain an LM pectin, gelatin or the like. As described above, when a gelling agent such as an LM pectin and gelatin is added to the fermented milk layer, the flavor peculiar to the fermented milk is impaired, and, in addition, the mouthfeel does not satisfy consumer preferences in recent years. Also, when a gelling agent is added to the fermented milk layer, there is a problem that the productivity of the fermented milk product decreases. Therefore, in the present invention, a gelling agent is preferably not added to the fermented milk layer. According to the present invention, the clear boundary surface between the fermented milk layer and the food layer can be maintained without addition of a gelling agent to the fermented milk layer.

A second aspect of the present invention relates to a method for manufacturing a two-layer type fermented milk product. The method for manufacturing according to the present invention includes the steps of: obtaining a fermented milk layer having a viscosity of 3500 cp or more; and forming a food layer containing an LM pectin having an esterification degree of less than 50 on the fermented milk layer. In the present invention, the value obtained by subtracting a Brix value of the fermented milk layer from a Brix value of the food layer is adjusted to 21.

Advantageous Effects of Invention

According to the present invention, the clear boundary surface between the fermented milk layer and the food layer can be maintained without addition of a gelling agent such as an LM pectin and gelatin to the fermented milk layer.

BRIEF DESCRIPTION OF DRAWINGS

FIG. 1 is a flowchart showing a method for manufacturing a fermented milk product according to one embodiment of the present invention.

DESCRIPTION OF EMBODIMENTS

Hereinafter, embodiments for carrying out the present invention will be described with reference to the drawings. The present invention is not limited to the embodiments described below, but includes modifications from the following embodiments appropriately made by those skilled in the art within the obvious scope.

In the specification of the present application, "A to B" means "A or more and B or less".

The present invention shows an example of the method for manufacturing the fermented milk product according to the present invention. Hereinafter, the fermented milk product according to the present invention and the method for manufacturing the same will be described along the flowchart shown in FIG. 1.

The fermented milk product according to the present invention is basically a two-layer type fermented milk product including a fermented milk layer placed as the lower layer and a food layer placed as the upper layer. In the present invention, the fermented milk layer and the food layer are separated from each other and basically do not mix. The present invention is not limited to a fermented milk product composed of only two layers, and includes a fermented milk product including two or more layers such as a fermented milk product including another fermented milk layer formed on the food layer, and a fermented milk product including another food layer formed under the fermented milk layer.

Examples of the fermented milk according to the present invention include a yoghurt. The yoghurt may be of a plane type having a certain hardness, a hard type, or a soft type. In the present specification, the fermented milk basically means "a fermented milk" (excluding a liquid fermented milk) defined by the ministerial ordinance concerning an ingredient standard and the like of Japanese milk and milk products.

In total nine steps shown in FIG. 1, steps S1 to S8 show the steps of manufacturing a fermented milk. The steps for manufacturing a fermented milk include a raw material milk adjustment step (S1), a heat sterilization (S2), a primary cooling step (S3), a starter inoculation step (S4), a fermentation step (S5), a pulverization step (S6), a concentration step (S7), and a secondary cooling step (S8).

The raw material milk adjustment step (S1) is a step of adjusting the raw material milk, a raw material of the fermented milk. The raw material milk is also called a yoghurt base or a yoghurt mix. In the present invention, a known raw material milk can be used. For example, the raw material milk may be a raw material milk made only from a raw milk (a 100% raw milk). The raw material milk may be a raw material milk adjusted by mixing a skim milk, a cream, water and the like with a raw milk. In addition to these, the raw material milk may also be a raw material milk adjusted by mixing (adding) a sterilized milk, a whole fat milk, a skimmed milk, a whole fat concentrated milk, a defatted concentrated milk, a whole milk powder, a buttermilk, a salted butter, an unsalted butter, whey, whey powder, a whey protein concentrate (WPC), a whey protein isolate (WPI), α-La (alpha-lactalbumin), β-Lg (beta-lactoglobulin), lactose and the like. The raw material milk may be a raw material milk adjusted by appropriately adding a thickening stabilizer, an emulsifier, sucrose (sugar), a sweetener, a food flavor, a vitamin, a mineral and the like. In the adjustment step of the raw material milk, fat globules and the like contained in the raw material milk are preferably atomized (pulverized) by homogenizing the raw material milk. That is, by homogenizing the raw material milk, the separation and floating of fatty ingredients of the raw material milk and the fermented milk during and after the manufacturing process of the fermented milk can be suppressed.

A gelling agent is preferably not added to the raw material milk to improve the flavor of the fermented milk and realize a smooth feeling on the tongue. Examples of the gelling agent include an LM pectin and gelatin. The fermented milk layer of the fermented milk product may have a content of these gelling agents of 0%. However, a gelling agent may be added as long as the flavor of the fermented milk is not affected. For example, when the used amount of the gelling agent is less than 0.05 wt %, the flavor of the fermented milk is hardly affected. Therefore, less than 0.05 wt % of the gelling agent may be added to the raw material milk.

The heat sterilization step (S2) is a step of heat-sterilizing the raw material milk adjusted in the raw material milk adjustment step. In the heat sterilization step, the raw material milk may be heat-treated at an adjusted heating temperature and heating time to the extent that bacteria in the raw material milk are sterilized. In the present invention, it is preferable that the raw material milk be heated to 80° C. or more, preferably 90° C. or more. For the heat sterilization step, a known method can be used. In the heat sterilization step, when the yoghurt is of a plain type, a hard type, or a soft type, heat treatment such as high temperature short time sterilization treatment (HTST) and ultra high temperature sterilization treatment (UHT) may be carried out. For example, the high temperature short time sterilization treatment (HTST) may be a treatment in which the raw material milk is heated to 80° C. to 100° C. for about 3 minutes to 15 minutes, and the ultra high temperature sterilization treatment (UHT) may be a treatment in which the raw material milk is heated to 110° C. to 150° C. for about 1 second to 30 seconds.

The primary cooling step (S3) is a step of cooling the raw material milk having a high temperature after the heat sterilization to a temperature range (a fermentation temperature range) that is suitable for fermentation. For example, the fermentation temperature range of lactic acid bacteria is generally 30 to 60° C. In the present invention, the raw material milk having a high temperature after the heat sterilization is preferably cooled, for example, to a fermentation temperature range of 35 to 55° C., and more preferably cooled to 40 to 50° C. For the primary cooling step, a known method can be used.

The starter inoculation step (S4) is a step of inoculating (mixing) a lactic acid bacteria starter (a bulk starter) into the raw material milk cooled to the fermentation temperature range. In the starter inoculation step, the lactic acid bacteria starter may be added after the temperature of the raw material milk decreased to a predetermined temperature after the heat sterilization step, or the lactic acid bacteria starter may be added while the temperature of the raw material milk is decreasing to a predetermined temperature after the heat sterilization step. The lactic acid bacteria starter is preferably added in an amount of 0.1 wt % or more relative to the raw material milk. Specifically, the lactic acid bacteria starter may be added in an amount of 0.1 to 10 wt %, 0.5 to 5 wt %, or 1 to 3 wt % relative to the raw material milk.

In the present invention, the lactic acid bacteria starter preferably includes Bulgaria bacteria. "Bulgaria bacteria" is herein Lactobacillus bulgaricus (L. bulgaricus). Examples of the Bulgaria bacteria include L. bulgaricus 1073R-1 strain (Lactobacillus delbrueckii subsp. bulgaricus 1073R-1 strain, deposit number: FERM BP-10741) and L. bulgaricus OLL 1171 strain (Lactobacillus delbrueckii subsp. bulgaricus OLL 1171 strain). The lactic acid bacteria preferably include Thermophilus bacteria. "Thermophilus bacteria" is herein Streptococcus thermophilus (S. thermophilus). In the present invention, in the starter addition step, in addition to Bulgaria bacteria and Thermophilus bacteria, known lactic acid bacteria may be added (mixed). For example, in the starter addition step, Gasseri bacteria (Lactobacillus gasseri (L. gasseri)), Lactis bacteria (Lactococcus lactis (L. lactis)), Cremoris bacteria (Lactococcus cremoris (L. cremoris)), Bifidus bacteria (Bifidobacterium) and the like may be added (mixed).

The fermentation step (S5) is a step of fermenting the raw material milk with the lactic acid bacteria starter. In the fermentation step, the raw material milk to which the lactic acid bacteria starter is added is fermented while keeping the raw material milk in the fermentation temperature range (for example, 30 to 60° C.) to obtain a fermented milk. In the present invention, for the fermentation step, a known method may be used. For example, in the fermentation step, the fermentation treatment may be carried out in a fermentation chamber or the like, or the fermentation treatment may be carried out in a jacketed tank. In the fermentation step, when the yoghurt is of a plain type, a hard type or the like, a post-fermentation treatment may be carried out, and when the yoghurt is of a soft type or the like, a pre-fermentation treatment may be carried out. Furthermore, for example, the fermentation step may be a treatment of fermenting the raw material milk in a fermentation chamber while maintaining the temperature in the fermentation chamber (the fermentation temperature) at about 30° C. to 60° C., or may be a treatment of fermenting the raw material milk in a jacketed tank while maintaining the temperature in the tank (the fermentation temperature) at about 30° C. to 60° C. In the fermentation step, for the conditions of fermenting the raw material milk, the fermentation temperature, the fermentation time and the like may be appropriately adjusted in consideration of type and quantity of the raw material milk and lactic acid bacteria, and the flavor, mouthfeel and the like of the fermented milk. Specifically, in the fermentation step, the raw material milk is preferably kept in the fermentation temperature range for 1 hour or more. In the fermentation step, the period of keeping the raw material milk (the fermentation time) is preferably 1 hour to 15 hours, more preferably 2 hours to 10 hours, and further preferably 7 hours to 8 hours.

In the fermentation step, for the conditions of fermenting the raw material milk, the lactic acid acidity (the acidity), pH and the like may be appropriately adjusted in consideration of type and quantity of the raw material milk and lactic acid bacteria, and the flavor, mouthfeel and the like of the fermented milk. Specifically, in the fermentation step, the lactic acid acidity preferably reaches 0.7% or more. Further, in the fermentation step, for example, when the solids non fat (SNF) is 11 to 12%, the lactic acid acidity is preferably 1.0% or less (0.7% to 1.0%), more preferably 0.95% or less (0.7% to 0.95%), and further preferably 0.9% or less (0.7% to 0.9%). The acidity (lactic acid acidity) of the raw material milk can be measured according to the "Test Method for Compositional Standards on Milk and Milk Products" under the Ministerial Ordinance for Milk and Milk Products.

In the present invention, the fermentation step may be the pre-fermentation treatment or the post-fermentation treatment. When the pre-fermentation treatment is carried out, the raw material milk is fermented before the raw material milk is filled in a container for actual sale as a product. When the pre-fermentation is carried out, the jacketed tank to which the raw material milk is filled is, for example, allowed to stand still to ferment the milk, and the fermented milk (the fermented milk curd), the obtained intermediate product, is crushed or atomized and then cooled, thereby the final fermented milk (a soft type yoghurt) may be obtained. Meanwhile, when the post-fermentation treatment is carried out, the raw material milk containing a lactic acid bacteria starter is filled in a container for actual sale as a product, and then this raw material milk is fermented. For example, when the post-fermentation treatment is carried out, the (sealed) container in which the raw material milk containing a lactic acid bacteria starter is filled is, for example, allowed to stand still in a fermentation chamber to ferment the milk, and the fermented milk (the fermented milk curd), the obtained intermediate product, is cooled, thereby the final fermented milk (a set type yoghurt or a plain type yoghurt) may be obtained. In the embodiment shown in FIG. 1, explanation is made for a case in which the pre-fermentation treatment is carried out. However, the present invention is not limited to the fermented milk obtained by the pre-fermentation treatment, and can also be applied to the fermented milk obtained by the above-mentioned post-fermentation treatment.

The pulverization step (S6) is a step of pulverizing the curd of the fermented milk obtained through the fermentation step. In the pulverization step, the curd is pulverized to obtain a smooth slurry fermented milk. In the pulverization step, for example, the curd is preferably gently pulverized in a tank having stirring blades. The stirring speed (the rotational speed of stirring blades) is preferably, for example, 50 to 1000 rpm, particularly preferably in the range of 50 to 500 rpm or 50 to 200 rpm.

The concentration step (S7) is a step of concentrating the slurry fermented milk obtained through the pulverization step to obtain a concentrated fermented milk. Specifically, whey (light liquid) is separated from the slurry fermented milk to obtain the concentrated fermented milk (heavy liquid). As a method of separating whey from the slurry fermented milk (the curd), known treatments such as centrifugation and membrane separation can be used. For example, for the centrifugation treatment of whey, a centrifuge such as a quark separator is preferably used. For the membrane separation treatment, an MF membrane (pore size: 0.01 μm to 10 μm) or a UF membrane (pore size: 0.001 μm to 0.01 μm) may be used. In particular, in the present invention, when the membrane separation treatment is carried out, the membrane separation with a UF membrane is preferably carried out. If necessary, by heating the slurry fermented milk, the efficiency of the separation treatment of whey can be increased.

The fermented milk is obtained through steps S1 to S7. In particular, in the above steps, the concentrated fermented milk from which whey is separated is obtained. Thus, by obtaining the concentrated fermented milk from which whey is separated, mixing and becoming muddy of the fermented milk layer and the food layer can be suppressed in the following filling step (S8). Even when the fermented milk product in which food is placed on the concentrated fermented milk is refrigerated, sinking of the food layer can be suppressed.

The fermented milk thus obtained has a viscosity of a predetermined value or more. For example, the fermented milk has a viscosity of at least 3500 cp or more. Specifically, the fermented milk preferably has a viscosity of 3500 to 10000 cp, and particularly preferably has a viscosity of 4000 to 8000 cp or 4000 to 6000 cp. When the fermented milk does not have a predetermined viscosity, the fermented milk and the food may mix and become muddy in the filling step described later. Thus, the viscosity of the fermented milk is adjusted to an appropriate range to prevent such mixing and becoming muddy. For example, known thickening stabilizers such as xanthan gum, guar gum, carrageenan, locust bean gum, and starch may be added to the raw material milk to adjust the viscosity of the fermented milk to an appropriate viscosity.

The filling step (S8) is a step of obtaining a two-layer type fermented milk product in which a food layer is formed on a fermented milk layer by filling the fermented milk (the concentrated fermented milk) obtained in the above steps in a container and further filling a food (a sauce with pulp and the like) on the fermented milk. The filling of the fermented milk in the container and the filling of foods in the container are preferably carried out in order. For example, first, the fermented milk is filled in the container, and then foods are filled thereon after a predetermined period (for example, 2 to 10 seconds or more). Thus, mixing and becoming muddy of the fermented milk layer and the food layer can be suppressed.

The food placed on the fermented milk is not particularly limited as long as it is suitable for eating with the fermented milk. Examples of the food include a fruit sauce, a sauce with fruit pulp, pulp, a pulp paste, a chocolate sauce, a caramel sauce, and a pudding. Among these foods, in particular, a sauce-like or paste-like food is preferably employed.

In the present invention, the food contains an LM pectin as a gelling agent. The LM pectin (low methoxyl pectin) means a pectin having an esterification degree of less than 50, and it is distinguished from an HM pectin (high methoxyl pectin) having an esterification degree of 50 or more. In particular, in the present invention, the LM pectin added to food preferably has an esterification degree of 15 to 40, and particularly preferably has an esterification degree of 20 to 40 or 30 to 38. Further, the food layer has a content of the LM pectin of 0.2 wt % or more. The content may be within a range allowing the appropriate gelation of the sauce-like or past-like food. Specifically, the content of the LM pectin may be 0.2 to 1.0 wt % or 0.3 to 0.6 wt %. Thus, a gelled food layer is preferably formed on the fermented milk layer. Such an LM pectin can be appropriately selected and obtained from commercially available pectins using mainly the esterification degree as an index. A pectin contains polygalacturonic acid as a main component, and carboxyl groups of a part of the galacturonic acid are methyl esterified. The esterification degree refers to the rate of this esterification.

A high intensity sweetener is preferably added to the food. The high intensity sweetener means a synthetic sweetener or a natural sweetener which gives sweetness tens to thousands of times higher than sugar when the same amount (weight) of sweetener as sugar is put in a mouth, and which can impart sufficient sweetness to the food by addition of its small amount. Examples of the high intensity sweetener include aspartame, acesulfame potassium, xylitol, disodium glycyrrhizinate, saccharin, calcium saccharin, saccharin sodium, sucralose, neotame, arabinose, licorice extract, xylose, stevia, thaumatin, Siraitia grosvenorii extract, rhamnose, and ribose. One kind selected from the above group may be added to foods, or two or more kinds may be added to foods. The content of the high intensity sweetener is preferably 0.0001 to 0.2 wt %, preferably at least 0.001 wt % or more, or 0.004 wt % or more based on the total amount of the food layer. Of course, sweetness can be adjusted by adding sugar to the food together with the high intensity sweetener. The food may not contain the high intensity sweetener and the sweetness may be adjusted with only sugar.

The fermented milk product according to the present invention has a characteristic that the difference in Brix values between the fermented milk layer and the food layer described above is adjusted to a predetermined value or less. The Brix value is a numerical value that indicates the content of a carbohydrate such as sugar, fructose, invert sugar, and glucose, and is a physical quantity used as a so-called sugar content. The Brix value is generally recognized as a sugar content. However, in a solution or slurry containing solid components other than sugar, carbohydrate components other than sugar also have refraction. Therefore, though the Brix value can be an index of the solid component concentration of sugar, it does not directly indicate the amount (the weight fraction) of carbohydrates.

In the fermented milk product of the present invention, the value obtained by subtracting a Brix value of the fermented milk layer from a Brix value of the food layer (hereinafter also referred to as "difference in Brix values" simply) is 21 or less. The difference in Brix values may be 21 or less, 20 or less, 18 or less, 15 or less, or 12 or less. Though there is no particular lower limit on the difference in Brix values, in order to maintain the taste of the fermented milk product, the Brix value of the fermented milk layer is preferably not higher than the Brix value of the food layer. Thus, the difference in Brix values may be 0 or more, and is preferably 5 or more, 8 or more, or 10 or more.

The Brix value of the food layer is generally higher than that of the fermented milk layer. Therefore, making the Brix value relatively small means lowering the Brix value of the food layer to approximate the Brix value of the food layer to the Brix value of the fermented milk layer, or increasing the Brix value of the fermented milk layer to approximate the Brix value of the fermented milk layer to the Brix value of the food layer. In the present invention, the Brix value of the food layer is preferably intentionally lowered to approximate the Brix value of the food layer to the Brix value of the fermented milk. Specifically, the Brix value of the food layer is preferably 32 or less, particularly preferably 30 or less, or 28 or less, and further may be 26 or less. The lower limit of the Brix value of the food layer is not particularly limited. However, since the Brix value of the fermented milk is generally 7 or more, the lower limit of the Brix value of the food layer may also be 7. In order to maintain the taste of the food, the Brix value of the food layer is preferably 7 or more, 10 or more, 15 or more, particularly preferably 20 or more, or 23 or more.

In order to maintain its sweetness while keeping the Brix value of the food layer relatively low, adding the high intensity sweetener to the food layer is effective. The high intensity sweetener has sweetness more than 10 times of sugar, and thus even adding a small amount of the sweetener can increase the sweetness. The Brix value of the food layer can also be kept low by lowering the amount of sugar added instead of adding the high intensity sweetener. As described above, the content of the high intensity sweetener is preferably 0.0001 to 0.2 wt % based on the total amount of the food layer. Meanwhile, when the high intensity sweetener is added to the food layer, the content of sugar is preferably 22 wt % or less, or 21 wt % or less, and particularly preferably 20 wt % or less, or 18 wt % or less based on the total amount of the food layer. The lower limit of the content of sugar is not particularly limited. However, it may be 10 wt % or more or 15 wt % or more to maintain the taste of the food layer.

As described above, due to the difference in Brix values between the food layer and the fermented milk layer of a predetermined value (specifically, 21) or less, sinking of the food layer and resulting unclear boundary surface between the layers can be effectively suppressed even when the fermented milk product in which the food layer is formed on the fermented milk layer is transported. When the boundary surface between the food layer and the fermented milk layer is clear, moving of the sweetness and flavor can be suppressed, and the taste of the fermented milk product can be maintained. In addition, moving of the color can also be suppressed, and thus the beautiful appearance can be also maintained. Examples of the fermented milk product according to the present invention will be described in detail below.

EXAMPLES

Preparation of Two-Layer Type Fermented Milk Product

According to the flowchart shown in FIG. 1, a concentrated fermented milk was prepared by carrying out the concentration step (removal of whey) after the fermentation, and then a two-layer type fermented milk product was manufactured from the concentrated fermented milk. In the preparation of the concentrated fermented milk, first, raw material milks were mixed to obtain an ingredient-adjusted preparation liquid having a total solid content of 11.1%, a fat content of 0.1%, and a protein content of 4.8%. Then, the preparation liquid was sterilized with a continuous plate heat exchanger, cooled to 43° C., then inoculated with a lactic acid bacteria starter, and fermented to pH 4.55. As a lactic acid bacteria starter, a mixture of Bulgaria bacteria and Thermophilus bacteria was used. After the completion of the fermentation, the fermented milk was stirred to crush the curd, and whey (light liquid) was separated with a nozzle separator (KNA-3: manufactured by GEA Westfalia Separator) to obtain a concentrated fermented milk (heavy liquid). The concentration rate was adjusted so that the heavy liquid has a protein concentration of 10%. The heavy liquid was cooled with a continuous tube heat exchanger to obtain a concentrated fermented milk. The concentration rate C was calculated from the formula (1).

$$C = \frac{F}{Q} = \frac{F}{F - W} \qquad (1)$$

F is the mass flow rate [kg/h] of the feed liquid, Q is the mass flow rate [kg/h] of the heavy liquid, and W is the mass flow rate [kg/h] of the light liquid. In a plastic cup, 98 g of the concentrated fermented milk was filled, and the surface was flattened. Thereby, a food layer was formed in the cup. Thereafter, 42 g of a sauce with pulp (a food) previously prepared was filled on the food layer. Thereby, a food layer was formed in the cup. Thus, a fermented milk product in which the food layer is formed on the fermented milk layer was obtained.

In each example and each comparative example described below, the concentration and the esterification degree of LM pectin added to the food, the sugar concentration and the stevia concentration of the food, the viscosity of the fermented milk, or the Brix values of the food and the fermented milk were each adjusted according to the purpose of the test based on the fermented milk and the food adjusted in accordance with the above.

Evaluation Method

Brix Value Measurement

The Brix values of the food layer and the fermented milk layer were measured using digital refractometer RX-5000i (manufactured by ATAGO CO., LTD.). The values were measured after the samples were stirred for 30 seconds at 30 rpm using a No. 4 (M23) rotor. The temperature of the samples during the measurement was set at 20° C.

Viscosity Measurement

The viscosity of the fermented milk was measured using B type viscometer TVB-10 (manufactured by TOKI SANGYO CO., LTD.). The value was measured after the sample at 10° C. was stirred for 30 seconds at 30 rpm using a No. 4 (M23) rotor.

Vibration Test

The vibration tolerance of the fermented milk was evaluated using transportation tester BF-50UT (manufactured by IDEX CO., LTD.). Vibration conditions were as follows.
Lo-Frequency setting: 5.0 Hz
Hi-Frequency setting: 50.0 Hz
Sweeping time: 15 m0s
Number of sweeping: once Flavor Evaluation The two-layer type fermented milk product stored at 10° C. was tasted to evaluate the flavor.

Boundary Surface Evaluation

The boundary surface between the fermented milk layer and the food layer of the fermented milk product stored under a predetermined storage condition was visually evaluated.

Test 1: Influence of Contained Amount of LM Pectin on Vibration Tolerance

Comparative Example 1

A fermented milk product in which a blueberry sauce (Brix value: 26) was filled on the prepared concentrated fermented milk (viscosity: 4000 cp, Brix value: 8.2) was obtained and stored under a condition of 5° C. overnight (24 hours, hereinafter the same applies). The blueberry sauce did not contain an LM pectin, and contained 21.2% of blueberry pulp, 19.2% of sugar, and 0.045% of stevia. The fermented milk product after being allowed to stand still overnight was subjected to the vibration testing machine. As a result, the boundary surface between the sauce and the fermented milk was disturbed greatly.

Example 1-1

The fermented milk product in which a blueberry sauce (Brix value: 26) was filled on the concentrated fermented milk same as above was obtained and stored under a condition of 5° C. overnight. The blueberry sauce contained 21.2% of blueberry pulp, 0.3% of an LM pectin having an esterification degree of 35, 19.2% of sugar, and 0.045% of stevia. The fermented milk product after being allowed to stand still overnight was subjected to the vibration testing machine. As a result, a slight disturbance was observed in the boundary surface between the sauce and the fermented milk. However, the disturbance was considered to be within an acceptable range.

Example 1-2

The fermented milk product in which a blueberry sauce (Brix value: 26) was filled on the concentrated fermented milk same as above was obtained and stored under a condition of 5° C. overnight. The blueberry sauce contained 21.2% of blueberry pulp, 0.5% of an LM pectin having an esterification degree of 35, 19.2% of sugar, and 0.045% of stevia. The fermented milk product after being allowed to stand still overnight was subjected to the vibration testing machine. As a result, almost no disturbance was observed in the boundary surface between the sauce and the fermented milk.

Example 1-3

The fermented milk product in which a blueberry sauce (Brix value: 26) was filled on the concentrated fermented milk same as above was obtained and stored under a condition of 5° C. overnight. The blueberry sauce contained 21.2% of blueberry pulp, 0.8% of an LM pectin having an esterification degree of 35, 19.2% of sugar, and 0.045% of stevia. The fermented milk product after being allowed to stand still overnight was subjected to the vibration testing machine. As a result, almost no disturbance was observed in the boundary surface between the sauce and the fermented milk.

As a result of the above-mentioned Test 1, it was confirmed that the boundary surface between the sauce and the fermented milk cannot be maintained when the sauce (the food layer) does not contain an LM pectin. Meanwhile, it was confirmed that the boundary surface between the sauce and the fermented milk can be maintained when the sauce contains an LM pectin.

Test 2: Influence of Esterification Degree of LM Pectin on Vibration Tolerance

Comparative Example 2-1

A fermented milk product in which a blueberry sauce (Brix value: 26) was filled on the prepared concentrated fermented milk (viscosity: 4000 cp, Brix value: 8.2) was obtained and stored under a condition of 5° C. overnight. The blueberry sauce contained 21.2% of blueberry pulp, 0.3% of an LM pectin having an esterification degree of 45, 19.2% of sugar, and 0.045% of stevia. The fermented milk product after being allowed to stand still overnight was subjected to the vibration testing machine. As a result, a large disturbance was observed in the boundary surface between the sauce and the fermented milk.

Comparative Example 2-2

The fermented milk product in which a blueberry sauce (Brix value: 26) was filled on the concentrated fermented milk same as above was obtained and stored under a condition of 5° C. overnight. The blueberry sauce contained 21.2% of blueberry pulp, 0.3% of an LM pectin having an esterification degree of 12, 19.2% of sugar, and 0.045% of stevia. The fermented milk product after being allowed to stand still overnight was subjected to the vibration testing machine. As a result, cracking was observed in the sauce.

Example 2-1

The fermented milk product in which a blueberry sauce (Brix value: 26) was filled on the concentrated fermented milk same as above was obtained and stored under a condition of 5° C. overnight. The blueberry sauce contained 21.2% of blueberry pulp, 0.3% of an LM pectin having an esterification degree of 34, 19.2% of sugar, and 0.045% of stevia. The fermented milk after being allowed to stand still overnight was subjected to the vibration testing machine. As a result, almost no disturbance was observed in the boundary surface between the sauce and the fermented milk.

Example 2-2

The fermented milk product in which a blueberry sauce (Brix value: 26) was filled on the concentrated fermented milk same as above was obtained and stored under a condition of 5° C. overnight. The blueberry sauce contained 21.2% of blueberry pulp, 0.3% of an LM pectin having an esterification degree of 38, 19.2% of sugar, and 0.045% of stevia. The fermented milk product after being allowed to stand still overnight was subjected to the vibration testing machine. As a result, a slight disturbance was observed in the boundary surface between the sauce and the fermented milk. However, the disturbance was considered to be within an acceptable range.

As a result of the above-mentioned Test 2, it was confirmed that the boundary surface between the sauce and the fermented milk cannot be maintained when the sauce (the food layer) contains an LM pectin having an esterification degree of 45 or more, though the sauce contains an LM pectin. It was also confirmed that cracking occurs in the sauce when an LM pectin having an esterification degree of 12 or less was used. Meanwhile, it was confirmed that the boundary surface between the sauce and the fermented milk can be maintained when the sauce contains an LM pectin having an esterification degree in the range of 34 to 38.

Test 3: Influence of Viscosity of Fermented Milk on Vibration Tolerance

Comparative Example 3

A fermented milk product in which a blueberry sauce (Brix value: 26) was filled on the prepared concentrated fermented milk (viscosity: 2000 cp, Brix value: 8.2) was obtained and stored under a condition of 5° C. overnight. The blueberry sauce contained 21.2% of blueberry pulp, 0.3% of an LM pectin having an esterification degree of 38, 19.2% of sugar, and 0.045% of stevia. The fermented milk after being allowed to stand still overnight was subjected to the vibration testing machine. As a result, a large disturbance was observed in the boundary surface between the sauce and the fermented milk.

Example 3-1

The fermented milk product in which the blueberry sauce same as above was filled on the prepared concentrated fermented milk (viscosity: 4000 cp, Brix value: 8.2) was obtained and stored under a condition of 5° C. overnight. The fermented milk product after being allowed to stand still overnight was subjected to the vibration testing machine. As a result, a slight disturbance was observed in the boundary surface between the sauce and the fermented milk. However, the disturbance was within an acceptable range.

Example 3-2

The fermented milk product in which the blueberry sauce (Brix value: 26) same as above was filled on the prepared concentrated fermented milk (viscosity: 6000 cp, Brix value: 8.2) was obtained and stored under a condition of 5° C. overnight. The fermented milk product after being allowed to stand still overnight was subjected to the vibration testing machine. As a result, no disturbance was observed in the boundary surface between the sauce and the fermented milk.

As a result of the above-mentioned Test 3, it was confirmed that the boundary surface between the sauce and the fermented milk cannot be maintained when the fermented milk has a viscosity of 2000 cp or less. Meanwhile, it was confirmed that the boundary surface between the sauce and the fermented milk can be maintained when the fermented milk has a viscosity of 4000 cp or more, preferably 6000 cp or more.

Test 4: Influence of Difference in Brix Values Between Fermented Milk and Sauce on Vibration Tolerance and Flavor in Storage Comparative Example 4

A fermented milk product in which a kiwi sauce (Brix value: 34.4) was filled on the prepared concentrated fermented milk (viscosity: 7400 cp, Brix value: 8.2) was obtained and stored under a condition of 10° C. overnight. The kiwi sauce contained 18.2% of kiwi pulp, 26.5% of sugar, and 0.6% of an LM pectin. The fermented milk product after being allowed to stand still overnight was subjected to the vibration testing machine. As a result, a large disturbance was observed in the boundary surface between the sauce and the fermented milk. The flavor of the fermented milk was good immediately after the production. However, the flavor of the sauce was remarkably impaired and became an unacceptable flavor after Day 8.

Comparative Examples 4-1 to 4-6

Sugar was added to the prepared concentrated fermented milk (viscosity: 7,400 cp, Brix value: 8.2), and the Brix value was defined as (A). A fermented milk product in which a kiwi sauce (Brix value: (B)) was filled on the concentrated fermented milk was obtained and stored under a condition of 10° C. overnight. The kiwi sauce contained 18.2% of kiwi pulp, (C) % of sugar, 0.6% of an LM pectin, and (D) % of stevia. The values of (A) to (D) are shown in Table 1 below. The fermented milk product after being allowed to stand still overnight was subjected to the vibration testing machine. As a result, no disturbance was observed in the boundary surface between the sauce and the fermented milk for all of Examples 4-1 to 4-6. The flavor of the fermented milk was good immediately after the production, and was maintained at an acceptable level even on Day 15 from the production.

when the value obtained by subtracting the Brix value of the fermented milk from the Brix value of the sauce is 11.2 to 20.7. It was also confirmed that, in such a case, the flavor of the fermented milk product can be maintained for a long time.

Summary of Tests 1 to 4

The test conditions and test results of Tests 1 to 4 are summarized in Table 2 below.

TABLE 2

| | | Sauce | | | Fermented milk | | Difference in Brix between sauce and fermented milk | | |
|---|---|---|---|---|---|---|---|---|---|
| | | Brix immediately after filling | LM pectin Esterification degree | LM pectin Concentration (%) | Brix value immediately after filling | Viscosity (cp) | | Storage condition | Boundary surface |
| Test 1 | Comparative Example 1 | 26 | — | 0 | 8.2 | 4,000 | 17.8 | 5° C. overnight | x |
| | Example 1-1 | 26 | 35 | 0.3 | 8.2 | 4,000 | 17.8 | 5° C. overnight | Δ |
| | Example 1-2 | 26 | 35 | 0.5 | 8.2 | 4,000 | 17.8 | 5° C. overnight | ○ |
| | Example 1-3 | 26 | 35 | 0.8 | 8.2 | 4,000 | 17.8 | 5° C. overnight | ○ |
| Test 2 | Comparative Example 2-1 | 26 | 45 | 0.3 | 8.2 | 4,000 | 17.8 | 5° C. overnight | x |
| | Comparative Example 2-1 | 26 | 12 | 0.3 | 8.2 | 4,000 | 17.8 | 5° C. overnight | x (Cracking in sauce) |
| | Example 2-1 | 26 | 34 | 0.3 | 8.2 | 4,000 | 17.8 | 5° C. overnight | ○ |
| | Example 2-2 | 26 | 38 | 0.3 | 8.2 | 4,000 | 17.8 | 5° C. overnight | Δ |
| Test 3 | Comparative Example 3 | 26 | 38 | 0.3 | 8.2 | 2,000 | 17.8 | 5° C. overnight | x |
| | Example 3-1 | 26 | 38 | 0.3 | 8.2 | 4,000 | 17.8 | 5° C. overnight | Δ |
| | Example 3-2 | 26 | 38 | 0.3 | 8.2 | 6,000 | 17.8 | 5° C. overnight | ○ |
| Test 4 | Comparative Example 4 | 34.4 | — | 0.6 | 8.2 | 7,400 | 26.2 | 10° C. overnight | x |
| | Example 4-1 | 31.2 | — | 0.6 | 10.5 | 7,400 | 20.7 | 10° C. overnight | ○ |
| | Example 4-2 | 31.2 | — | 0.6 | 13.6 | 7,400 | 17.6 | 10° C. overnight | ○ |
| | Example 4-3 | 27.9 | — | 0.6 | 10.5 | 7,400 | 17.4 | 10° C. overnight | ○ |
| | Example 4-4 | 27.9 | — | 0.6 | 13.6 | 7,400 | 14.3 | 10° C. overnight | ○ |
| | Example 4-5 | 24.8 | — | 0.6 | 10.5 | 7,400 | 14.3 | 10° C. overnight | ○ |
| | Example 4-6 | 24.8 | — | 0.6 | 13.6 | 7,400 | 11.2 | 10° C. overnight | ○ |

TABLE 1

| | Brix value immediately after filling | | | (C) Sugar concentration (%) | (D) Stevia concentration (%) |
|---|---|---|---|---|---|
| | (A) Fermented milk | (B) Sauce | (B) − (A) Difference | | |
| Comparative Example 4 | 8.2 | 34.4 | 26.2 | 26.5 | 0 |
| Example 4-1 | 10.5 | 31.2 | 20.7 | 23.2 | 0 |
| Example 4-2 | 13.6 | 31.2 | 17.6 | 23.2 | 0 |
| Example 4-3 | 10.5 | 27.9 | 17.4 | 20.2 | 0.00478 |
| Example 4-4 | 13.6 | 27.9 | 14.3 | 20.2 | 0 |
| Example 4-5 | 10.5 | 24.8 | 14.3 | 17.2 | 0.01978 |
| Example 4-6 | 13.6 | 24.8 | 11.2 | 17.2 | 0 |

As a result of the above-mentioned Test 4, it was confirmed that the boundary surface between the sauce and the fermented milk cannot be maintained when the value obtained by subtracting the Brix value of the fermented milk from the Brix value of the sauce is 26.2 or more. It was also confirmed that, in such a case, the flavor of the fermented milk product is remarkably impaired after long-term storage. Meanwhile, it was confirmed that the clear boundary surface between the sauce and the fermented milk can be maintained From the results of the above tests 1 to 4, it was confirmed that, in order to prevent the sinking of the sauce, maintain the clear boundary surface between the sauce and the fermented milk, and maintain the flavor of the fermented milk product for a long time, it is optimal that 0.3 wt % or more of an LM pectin be added to the sauce, the LM pectin have an esterification degree in the range of 34 to 38, the fermented milk have a viscosity of 4000 cp or more, and the value obtained by subtracting the Brix value of the fermented milk from the Brix value of the sauce be 20.7 or less. It was also confirmed that, in order to obtain the difference in Brix values between the fermented milk and the sauce of 20.7 or less while keeping the flavor and taste of the fermented milk layer, the Brix value of the sauce is preferably decreased, and, in such a case, adding a high intensity sweetener such as stevia to the sauce is effective.

To specifically describe the contents of the present invention, the Examples of the present invention have been described. However, the present invention is not limited to the above-described best Examples, but includes modifications and improvements obvious to those skilled in the art based on matters described in this specification.

INDUSTRIAL APPLICABILITY

The present invention relates to a two-layer type fermented milk product in which a food such as a fruit sauce is placed on a fermented milk, and a method for manufacturing the same. Therefore, the present invention can be suitably used in the manufacturing industry of a fermented milk such as yoghurt.

The invention claimed is:

1. A method for manufacturing a fermented milk product, comprising the steps of:
   pulverizing a curd of a fermented milk to obtain a slurry fermented milk;
   obtaining a concentrated fermented milk layer having a viscosity of 3500 cp or more by removing whey from the slurry fermented milk; and
   forming a food layer containing a low methoxyl pectin having an esterification degree of less than 50 on the concentrated fermented milk layer,
   wherein a value obtained by subtracting a Brix value of the concentrated fermented milk layer from a Brix value of the food layer is 11 to 21, and
   the concentrated fermented milk layer has a gelling agent content of 0% by weight or contains less than 0.05% by weight of gelling agent.

* * * * *